United States Patent [19]

Maucher

[11] 4,116,313
[45] Sep. 26, 1978

[54] DRIVE MECHANISM FOR UTILITY OR COMMERCIAL VEHICLES SUCH AS TRACTORS, CONSTRUCTION MACHINERY OR THE LIKE

[75] Inventor: Paul Maucher, Sasbach, Germany

[73] Assignee: Luk Lamellen und Kupplungsbau GmbH, Sasbach, Germany

[21] Appl. No.: 720,632

[22] Filed: Sep. 7, 1976

[30] Foreign Application Priority Data

Sep. 10, 1975 [DE] Fed. Rep. of Germany ....... 2540214

[51] Int. Cl.² .................. G05G 5/10; G05G 11/00; F16D 67/00
[52] U.S. Cl. .................. 192/3.63; 74/15.66; 74/476; 74/477; 74/481; 74/483 R
[58] Field of Search .............. 192/3.63; 74/15.66, 74/15.86, 476, 477, 481, 483 R

[56] References Cited

U.S. PATENT DOCUMENTS

| 2,369,078 | 2/1945 | Shaeffer | 74/483 |
| 3,984,967 | 10/1976 | Jones | 192/3.63 X |
| 3,987,686 | 10/1976 | Paplaski | 74/476 |

*Primary Examiner*—Allan D. Herrmann
*Attorney, Agent, or Firm*—Herbert L. Lerner

[57] ABSTRACT

Drive mechanism for heavy vehicles such as tractors, construction machinery and the like, wherein one of two clutches is selectively blocked by a shifting device so as to prevent engagement and disengagement thereof, while the other of the two clutches is released so as to be engageable and disengageable, and wherein an output shaft of a transmission is drivable by the one clutch in one rotary direction, and the same output shaft is drivable by the other clutch in the other rotary direction, a set of reversing gears being connectible to the transmission through the other clutch, includes a control clutch disposed in force transmission path between the other clutch and the output shaft of the transmission, and including an additional output shaft for an auxiliary drive, and means for shifting power flow selectively to the transmission and to the additional output shaft.

8 Claims, 7 Drawing Figures

DRIVE MECHANISM FOR UTILITY OR COMMERCIAL VEHICLES SUCH AS TRACTORS, CONSTRUCTION MACHINERY OR THE LIKE

The invention relates to a drive mechanism such as a gear shift for heavy or commercial or useful vehicles such as tractors, construction machinery or the like, wherein one of two clutches can be blocked selectively by a shifting device, while the other clutch is released for engaging and disengaging, and the one clutch serves for driving the output shaft of the transmission in one rotary direction, while the other of the clutches serves for driving the same output shaft in the other rotary direction, a set of reversing gears being connectible to the transmission through the other clutch.

In a shifting arrangement that has become known heretofore from German Pat. No. DT-BP 1,257,595, blocking of the one clutch, for example that clutch which is provided for forward drive, occurs in the opened condition and, furthermore, engagement and disengagement of the unblocked clutch, i.e., that clutch, for example, which serves for reverse drive, as well as shifting to block the other clutch and to free or release the forward drive clutch occurs by means of a single pedal which acts upon a shifting device, this pedal being moved over an actuating distance extending beyond the actuating travel of the respective unblocked clutch. It has furthermore become known heretofore to use so-called separately shiftable double or dual clutches which are combined, however, into one unit, instead of the separated arrangement of two clutches shown in the foregoing German patent.

Such devices have proven themselves in practice, but it is desirable, however, for many applications thereof to selectively drive from the same drive machine or connected thereto, various secondary or auxiliary units also.

Accordingly, it is an object off the invention to provide a drive mechanism for farm tractors, construction machinery or the like, wherein engaging and disengaging of the transmission is possible in reversible operation, i.e., during forward as well as during reverse travel, and futhermore, shifting is possible from forward to reverse travel and vice versa, as well as adding or connecting another output such as a power take-off.

With the foregoing and other objects in view, there is provided in accordance with the invention, a drive mechanism of tye type mentioned at the introduction hereto, wherein, in the power transmission path between one of the clutches, for example, the other of the clutches, and the transmission, an additional or control clutch is provided by means of which the flow of power can be shifted selectively to the transmission, namely for example through a set of reversing gears, or to a further output drive such as a power take-off. Advantageously, the additional or control clutch is provided in the vicinity of the set of reversing gears and operates in such a manner that the secondary or auxiliary output drive is engageable only if the set of reversing gears is disengaged.

In this connection, and in accordance with another feature of the invention, it is particularly advantageous when the secondary or auxiliary output drive is engageable only if the other clutch is blocked by the shifting device, i.e., if the reversing clutch is open, and the clutch for the forward drive is freed or released by the shifting device for engaging and disengaging. For this purpose it is also advantageous in accordance with a further feature of the invention when, in dependence upon the position of a shifting or switching linkage for the additional or control clutch and in the position thereof wherein the secondary or auxiliary drive is engaged, blocking means or a stop become effective, preventing shifting of the shifting device, i.e., blocking of the forward drive clutch and releasing or freeing of the other clutch. This is accomplished, for example, by the provision that the shift path be blocked at or ahead of the shifting device per se or by providing that a stop be introduced behind the shifting device and in the path of movement of at least one of the actuating linkages e.g. in the path of movement of the actuating linkage for the other clutch, this stop being movable in dependence upon the shifting or switching.

In order now to drive the secondary or auxiliary output drive through the other clutch in this shift position, i.e., with the secondary or auxiliary output engaged, and with the other clutch blocked and the forward drive clutch released for engaging and disengaging, it is advantageous, in accordance with an added feature of the invention, that switching or shifting means, e.g., a slider, be movable in the path of motion of the actuating linkage for the other clutchh, and, in fact, in the region between the shifting device and the disengaging levers of this other clutch. This slider is movable in dependence upon the position or jointly with an actuating linkage for the additional or control clutch, and acts upon the actuating system of the other clutch in the hereinaforedescribed manner. So that, in this shift position, the additional or auxiliary output drive can also be stopped or disengaged, in accordance with an additional feature of the invention, in the force transmission path of the actuating linkage for the other clutch, a further independent actuating linkage is provided which is actuatable, for example, by means of a hand lever, so that this other clutch and thereby, the secondary or auxiliary output drive, are engageable or disengageable independently of the foot pedal.

It is furthermore of particular advantage, in accordance with yet another feature of the invention, with the set of reversing gears engaged and the forward drive clutch, which is blocked by the shifting device, in disengaged position, and with the other clutch released for engaging or disengaging, a locking device becomes operative so as to avoid shifting of the additional or control clutch to the further or auxiliary output drive, i.e., for example, to the power take-off. This is effected, in accordance with yet a further feature of the invention, by the provision that a locking device become operative which engages, for example, with the actuating linkage for the one clutch and prevents a displacement of the slider and the shifting or switching linkage for the additional or control clutch.

In this position, the slider, which is controlled by the additional or control clutch, effects a linking-up of the linkage of the other clutch to the shifting device. Then, the other clutch is engageable and disengageable through the shifting device by the pedal or, however, through the hereinafore mentioned manually actuatable shifting or switching mechanism.

Other features which are considered as characteristic for the invention are set forth in the appended claims.

Although the invention is illustrated and described herein as embodied in a drive mechanism for utility or commercial vehicles such as tractors, construction machinery or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic and schematic view of a drive mechanism for commercial or utility vehicles, such as tractors, construction machinery and the like;

FIG. 1a in an enlarged fragmentary view of FIG. 1 as seen from the right-hand side thereof;

FIGS. 2 and 2a are views corresponding respectively, to those of FIGS. 1 and 1a showing the drive mechanism of the invention in a different mode of the operation thereof;

FIGS. 3 and 3a are further views corresponding, respectively, to those of FIGS. 1 and 1a showing the drive mechanism in yet another mode of operation thereof;

Figure 1:
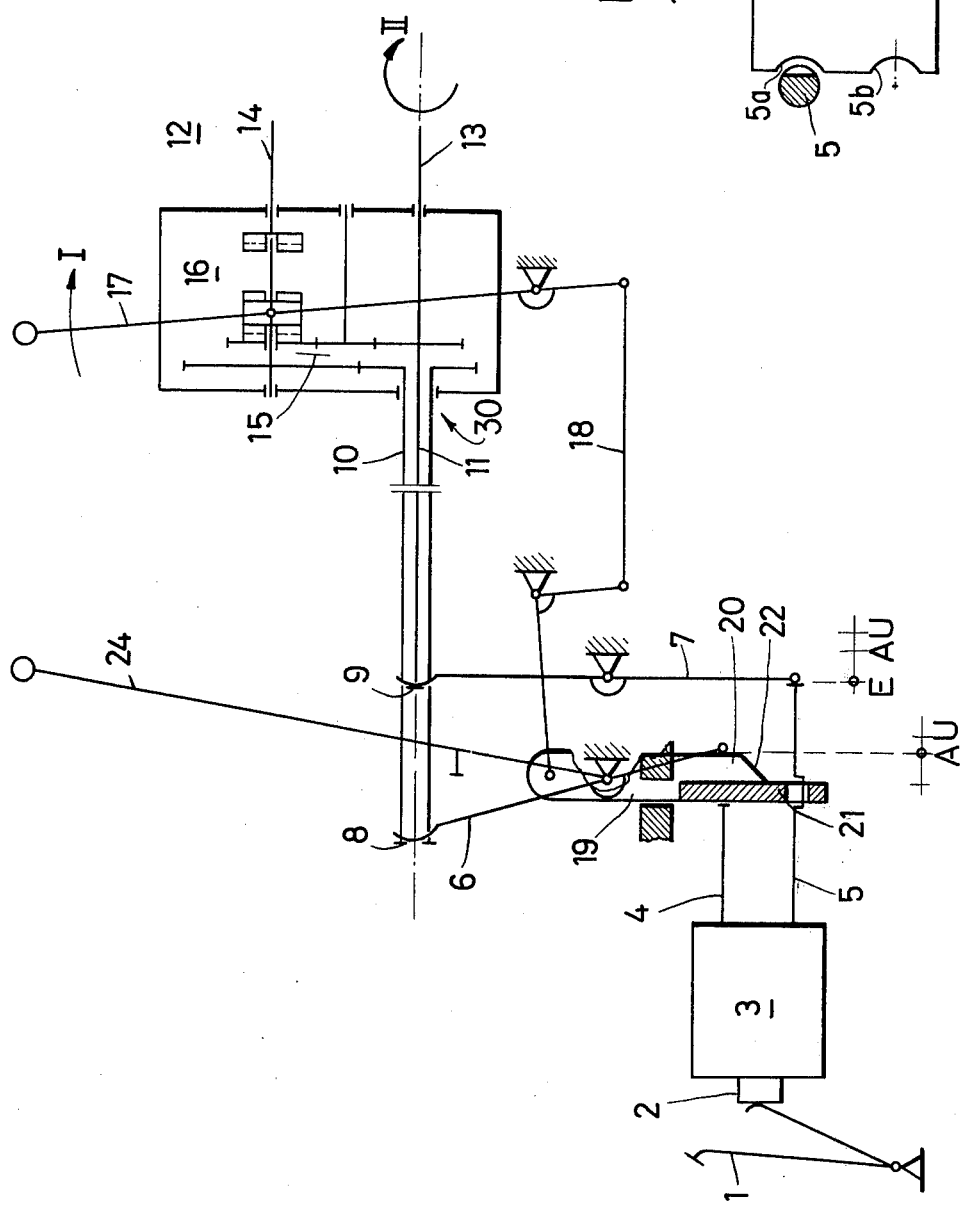
Figure 4:
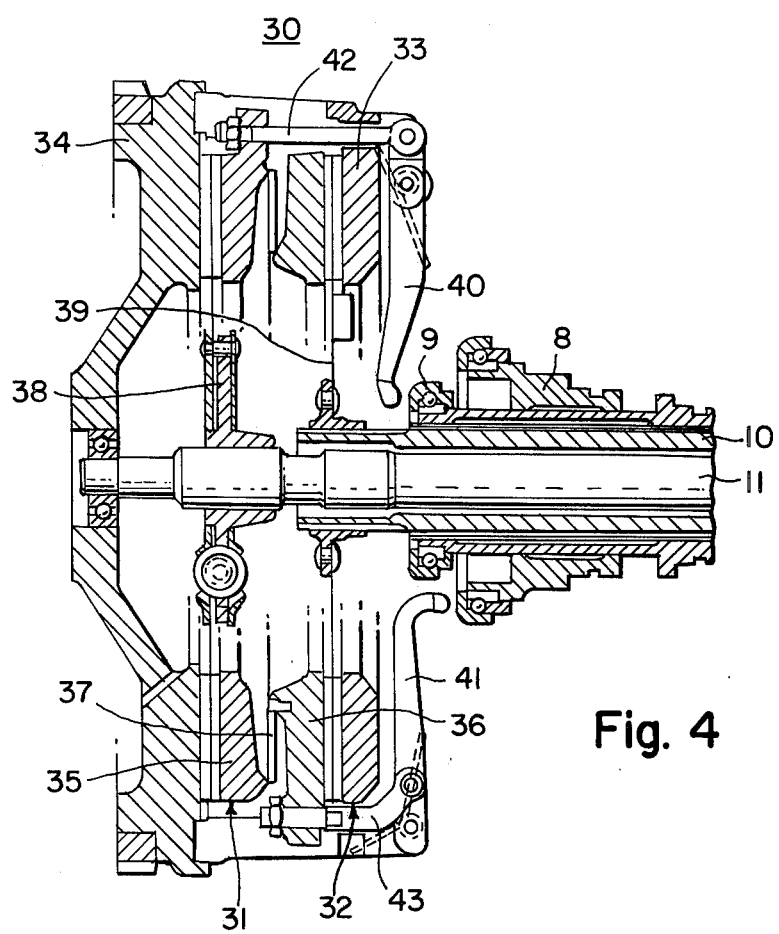
FIG. 4 is a cross-sectional view of a conventional double clutch for a tractor, for example, as used with the drive mechanism according to the invention.

Referring now to the drawing and first, particularly, to FIGS. 1 and 1a thereof, there is shown an input element of a shifting device 3 actuatable by a diagrammatically illustrated foot pedal 1 by which two output members 4 and 5 are selectively and alternatingly actuatable in turn. The output members 4 and 5 respectively control a shifting linkage 6 and 7 and, through respective indicated shifter rods 8 and 9, a respective clutch 31, 32 of a conventional double clutch 30 of a utility or commercial vehicle such as a tractor or building machinery or the like, as shown in FIG. 4. In this regard, either a hollow shaft 10 of a transmission 12 is selectively or alternatingly shiftable by means of the output member 4, the linkage 6 and the shifter rod 8 or a solid shaft 11 of the transmission 12 by the output member 5, the linkage rod 7 and the shifter rod 9. The transmission 12, which is also only shown diagrammatically, has an output shaft 13 for reversible operation, i.e., forward or reverse drive, and an additional output shaft 14 for an auxiliary drive, such as a power take-off.

The solid shaft 11 is, in this regard, the direct input shaft for the transmission 12, forward travel being selectable by means of the respective clutch 31 of the double clutch 30. The hollow shaft 10 acts upon a set 15 of reversing gears, which are connectible by means of a control clutch 16 to act upon the transmission shaft 13 and, in fact, in the engaged condition of the corresponding clutch of the double clutch 30.

Figure 3:
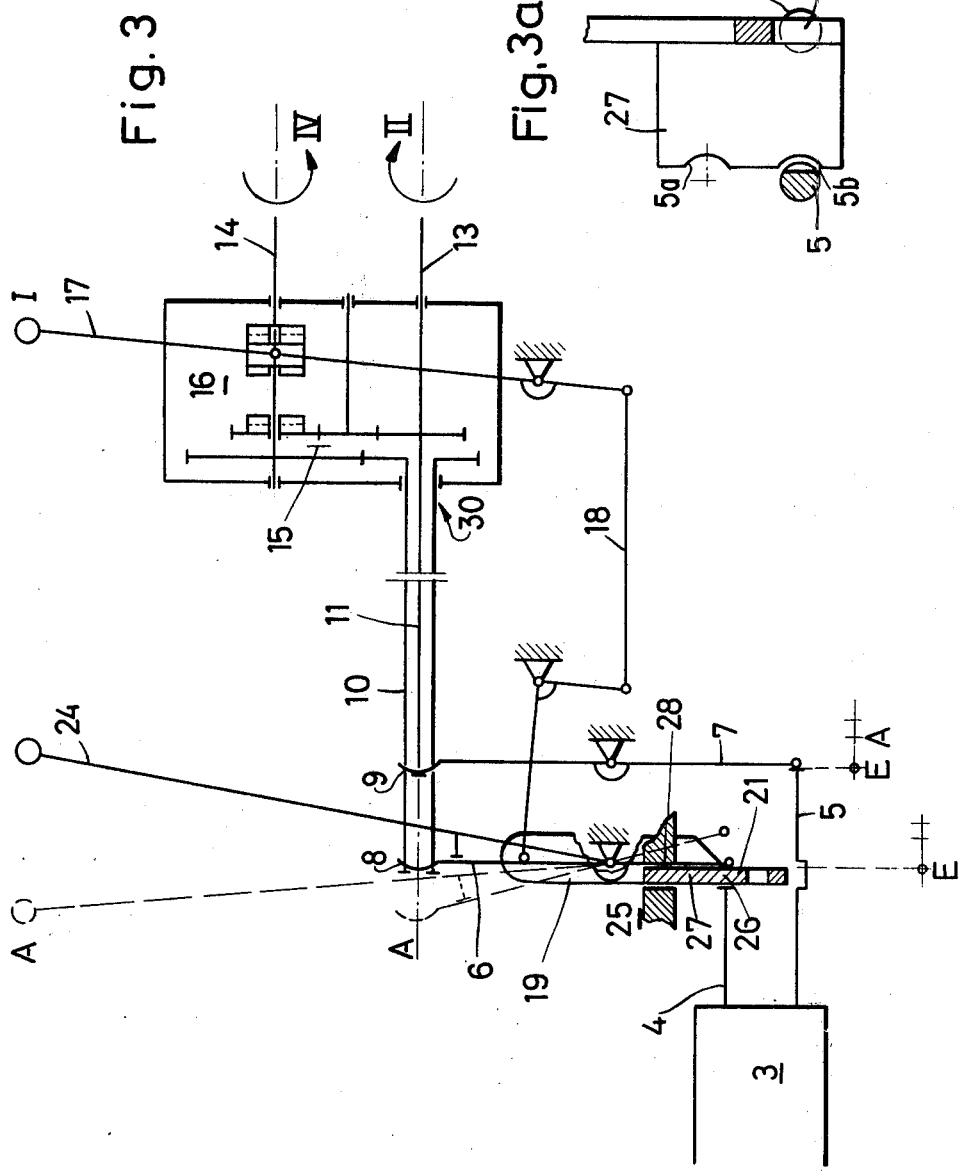

The control clutch 16 can connect the shaft 14 fluidically with the hollow shaft 10 by non-illustrated conventional means when an actuator rod 17 is shifted in direction of the arrow I, the set 15 of reversing gears being simultaneously separated or disengaged from drive by the hollow shaft 10. This stage of operation of the drive mechanism of the invention is illustrated in FIG. 3.

In the stage of operation of the drive mechanism shown in FIG. 1, the output member 4 of the shifting device 3 is shown in blocked position A thereof, i.e., the position wherein the respective clutch 32 of the double clutch 30 is held thereby in disengaged condition. By means of the shifting device 3, the particular clutch 31 of the double clutch 30 that is associated with the solid shaft 11 is released so as to be engageable and disengageable, the mode of operation of the drive mechanism depicted in FIG. 1 representing the condition E when the respective clutch is in engaged position. Through actuation of the foot pedal 1 and thereby, of the output member 5 in the region between the conditions E and A, the respective clutch 31 of the double clutch 30 can be disengaged and re-engaged.

As mentioned hereinbefore, the clutch 31 associated with the solid shaft 11 is released for disengaging and engaging, in the mode illustrated in FIG. 1, and the shaft 13 can rotate in the rotary direction represented by the arrow II, which corresponds to forward travel. When operating the clutch 31 in the region between E and A, the various gears can be shifted. An additional linkage 18 is connected to the hand lever 17 for the auxiliary control clutch 16, a slider 19 being fastened to the linkage 18 and having two contact surfaces 20 and 21 engageable with the lever 6; and connected one to the other by an inclined portion 22. In the mode of the drive mechanism shown in FIG. 1, the lever 6 engages the contact surface 20, thereby bridging the distance between the linkage 6 and the output member 4.

Figure 2:
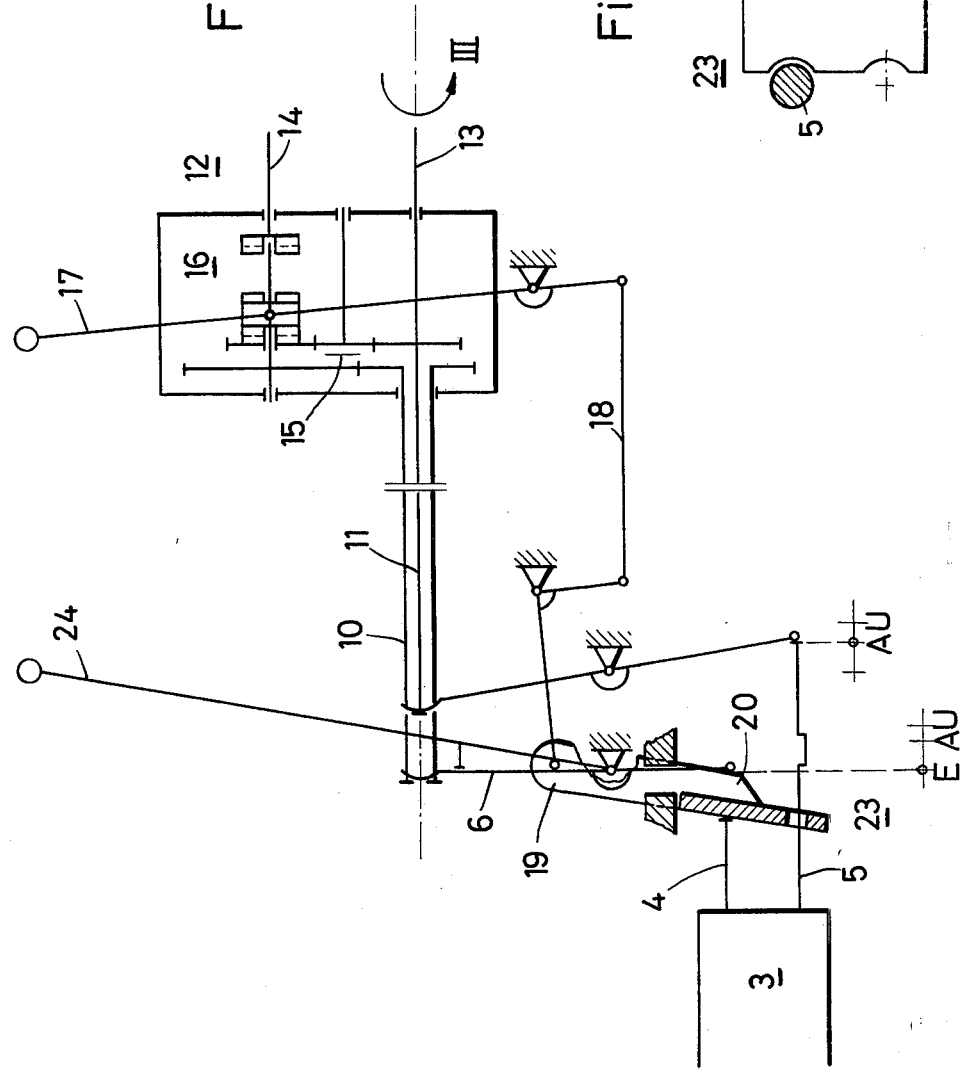

In the mode of the drive mechanism illustrated in FIG. 1 and in the position of the control clutch 16 as shown therein, it is possible to switch from forward drive to reverse drive, the respective non-illustrated clutch being actuated by the foot pedal 1 and, accordingly, by the output members 4 and 5 traversing the shift path A to U, thereby attaining the mode of the drive mechanism shown in FIG. 2. As shown in FIG. 1a, recesses 5a and 5b formed in the slider 19 accommodate the output member 5.

In this regard, the output member 5 is shown in blocked position of the clutch 31 thereof attained by means of the shifting device 3, and corresponding to the disengaged condition A of the respective clutch 31 of the double clutch 30 associated with the solid shaft 11. The shaft 11 is therefore separated or disengaged from drive by the clutch 31 associated therewith. The output member 4 is released or freed for engaging and disengaging the respective clutch 32 of the double clutch 30 associated with the hollow shaft 10. In the mode of the drive mechanism depicted in FIG. 2, the corresponding clutch 32 of the double clutch 30 associated with the hollow shaft 10 is in the engaged condition E. The slider 19 is in the position relative to the hand lever 17 and the linkage 6 shown in FIG. 1. The clutch 32 associated with the hollow shaft 10, in the mode of the mechanism shown in FIG. 2 drives the output shaft 13 by means of the set 15 of reversing gears in the rotary direction represented by the arrow III, opposite that of FIG. 1. The vehicle is therefore moved, for example, in reverse drive and, by actuating the pedal 1 and an actuating travel path corresponding to the path E to A, the transmission 12 can be engaged or disengaged.

In order to prevent the control clutch 16 from being shiftable to secondary or auxiliary drive as in the mode of the mechanism illustrated in FIG. 3, a locking device 23 is made effective, in the mode of the mechanism shown in FIG. 2, in fact between the slider 19 and the output member 5, so that the lever 17 cannot be pivoted.

By actuating the foot pedal over a path extending beyond the condition for disengagement travel A, i.e., until the shift or changeover condition U is reached, the mode of the mechanism shown in FIG. 1 can be reached again.

As compared to the position thereof shown in the mode of the mechanism illustrated in FIG. 1, the control clutch 16 has been swung over by means of the hand lever 17, in the position of the control clutch 16 shown in FIG. 3, and has thereby connected the secondary or auxiliary output shaft 14, for example, a power take-off, to the hollow shaft 10. Simultaneously, the set 15 of reversing gears is disengaged from the transmission 12. By means of the clutch 31 associated with the solid shaft 11, the shaft 13, which can consequently be driven again in the rotary direction II, as shown in FIG. 3, is disengageable or engageable by means of the foot pedal 1, the output member 5 of the shifting device 3 and the lever 7, and, indeed, in the region between the disengaged condition A and the engaged condition E of the respective clutch 31. As shown in FIG. 3a, recesses 5a and 5b formed in the slider 19 accommodate the output member 5.

By means of the lever 17 and the linkage 18, the slider 19 has been brought into a position shown in FIG. 3 wherein the lever 6 engages the contact surface 21, which corresponds to the engaged condition E of the clutch 32 associated with the hollow shaft 10. The shaft 14 is thereby connected to the drive in the transmission 12 and can execute a rotary motion in the assumed direction IV. In order, also, to be able to separate or disengage the shaft 14 from the drive of the transmission 12, if required, an additional actuating lever in the form of a hand lever 24 is provided which can move the lever 6 independently of the output member 4, as is diagrammatically represented by the push rod extending transversely from the hand lever 24, and whereby the corresponding clutch 32 of the double clutch 30 can be disengaged into the condition A.

In the mode of the drive mechanism shown in FIG. 2, the hand lever 24 may also serve, however, for engaging and disengaging the clutch 32 associated with the hollow shaft 10, so that, in addition to the possibility provided by the foot pedal 1 of separating the drive of the shaft 13, this possibility is also provided by manual shifting with the hand lever 24.

In order to prevent the shifting device 3 from being shifted, in the mode of the mechanism shown in FIG. 3, a locking device 25 is made effective, by the engagement of the output member 4 with the contact surface 26 of the slider 19 and by the introduction of the slider 19 per se, namely the part 27 thereof, into a coulisse or slot 28, and, indeed, through motion of the lever 17 into the position I thereof shown in FIG. 3. From this position I of the lever 17, it can be moved again into the position thereof shown in FIG. 1, the shaft 13 being connected again to the drive line or string by means of the control clutch 16 and the set 15 of reversing gears and, in fact, by means of the hollow shaft 10. The slider 19 is simultaneously shifted by means of the linkage 18.

More specifically with respect to FIG. 4 of the drawing, the conventional double clutch illustrated therein, in addition to having the two clutches 31 and 32, also has a common housing 33 therefor which is fastened to a flywheel 34. The clutches 31 and 32 have respective pressure plates 35 and 36 that are acted upon by a common plate or cup spring 37 in direction toward respective clutch discs 38 and 39. In the position thereof illustrated in FIG. 4, both clutches 31 and 32 are blocked or locked. The lever 40 serves as actuating means for engaging and disengaging the clutch 31, and the lever 41 for engaging and disengaging the clutch 32.

To disengage the clutch 31, the shifter rod 9 is moved toward the left-hand side of FIG. 4 and, through the lever 41 and a tension rod 42, the pressure plate 35 is lifted from the friction disc 38, and the drive of the shaft 11 is thereby interrupted.

To disengage the clutch 32, the shifter rod 8 moves the lever 41 and a respective compression member 43. The pressure plate of the clutch 32 is thereby lifted from the friction disc 39 and, accordingly, the drive of the hollow shaft 10 is interrupted.

There are claimed:

1. Drive mechanism for heavy vehicles such as tractors, construction machinery and the like, wherein one (31) of two clutches (31, 32) is selectively blocked by a shifting device (3) so as to prevent engagement and disengagement thereof, while the other (32) of the two clutches (31, 32) is released so as to be engageable and disengageable, and wherein an output shaft (13) of a transmission (12) is drivable by the one clutch (31) in one rotary direction, and the same output shaft (13) is drivable by the other clutch (32) in the other rotary direction, a set of reversing gears (15) being connectible to the transmission (12) through the other clutch (32), comprising a control clutch (16) disposed in force transmission path between the other clutch (32) and the output shaft (13) of the transmission (12), and including an additional output shaft (14) for an auxiliary drive, and means (4, 6, 8; 5, 7, 9) for shifting power flow selectively to the output shaft (13) of the transmission (12) and to said additional output shaft (14) thereof.

2. Drive mechanism according to claim 1 including means (25) for preventing shifting of the shifting device (3) in dependence upon the auxiliary drive (14) engageable through said control clutch (16) and through the other (32) of the two clutches (31, 32) blocked by the shifting device (3).

3. Drive mechanism according to claim 1, switching means comprising a slider (19) effective, depending upon the shift position of said control clutch (16), in a region between the shifting device (3) and actuating lever means (6) for engaging and disengaging the other (32) of the clutches (31, 32).

4. Drive mechanism according to claim 3 wherein, in condition wherein said auxiliary drive (14) is engaged by said control clutch (16) and the other (32) of the two clutches (31, 32) is blocked by the shifting device (3), the other clutch (32) is engaged by said switching means (19).

5. Drive mechanism according to claim 3, wherein in condition wherein a set of reversing gears (15) in the transmission (12) is engaged by said control clutch (16) and the other clutch (32) is blocked by said shifting device (3), the other clutch (32) is disengaged by said switching means (19).

6. Drive mechanism according to claim 3 comprising a manually actuatable switching linkage (17, 18) connected to said control clutch (16) and to said switching means (19) for moving said switching means (19) in dependence upon movement of said control clutch (16).

7. Drive mechanism according to claim 3 including a further actuating linkage (24) disposed in force transmission path of said actuating lever means (6) for the other clutch (32) in a region of the force transmission path between the shifting device (3) and disengaging levers (8) for the other clutch (32), said further actuating linkage (24) being effective for disengaging and engaging the other clutch (32).

8. Drive mechanism according to claim 3 including a locking device (23) which, in condition wherein a set of reversing gears (15) in the transmission (12) is engaged by said control clutch (16), the one clutch (31) is blocked by the shifting device (3), and the other (32) of the two clutches (31, 32) is freed for engaging and disengaging, is operative for preventing engagement of said auxiliary drive (14) by said control clutch (16).

* * * * *